(12) United States Patent
Wagner

(10) Patent No.: US 9,682,499 B2
(45) Date of Patent: Jun. 20, 2017

(54) INDUCTION MOLDED COMPONENTS AND METHOD OF INDUCTION FORMING COMPONENTS FOR MOLD PARTING LINE MINIMIZATION

(71) Applicant: Harmac Medical Products, Inc., Buffalo, NY (US)

(72) Inventor: James Wagner, Lancaster, NY (US)

(73) Assignee: Harmac Medical Products, Inc., Buffalo, NY (US)

(*) Notice: Subject to any disclaimer, the term of this patent is extended or adjusted under 35 U.S.C. 154(b) by 176 days.

(21) Appl. No.: 14/644,246

(22) Filed: Mar. 11, 2015

(65) Prior Publication Data
US 2016/0263792 A1    Sep. 15, 2016

(51) Int. Cl.
*B29C 37/02* (2006.01)
*B29C 35/08* (2006.01)

(52) U.S. Cl.
CPC ...... *B29C 37/02* (2013.01); *B29C 2035/0811* (2013.01)

(58) Field of Classification Search
CPC ............. B29C 37/02; B29C 2035/0811
See application file for complete search history.

(56) References Cited

U.S. PATENT DOCUMENTS

| | | | | |
|---|---|---|---|---|
| 1,833,973 A | * | 12/1931 | Patterson | B29C 33/005 65/227 |
| 1,867,561 A | * | 7/1932 | Bobrick | B65D 59/04 229/201 |
| 3,661,492 A | * | 5/1972 | Massa | B29C 49/72 425/526 |

* cited by examiner

Primary Examiner — Jill Heitbrink
(74) Attorney, Agent, or Firm — Del Vecchio and Stadler LLP

(57) ABSTRACT

There is a molding assembly that comprises a jaw holding assembly having a base member that is joined to a workpiece locating member. The workpiece locating member is joined to a riser member, and a rail is mounted on the riser member and a carriage is supported on the rail. The molding assembly includes a jaw holder that is mounted on the carriage, and the jaw holder supports first and second forming dies, and each has an internal rib that abut one another when the first and second dies are brought together. Together the dies form an elliptical rib having an elliptical shaped curved surface. A workpiece having an O-ring recess and parting line protrusions is positioned between the first and second forming dies, and the dies are heated and melt the parting line protrusions. An O-ring is disposed in the O-ring recess to form a leak proof seal.

12 Claims, 11 Drawing Sheets

Figure 1:
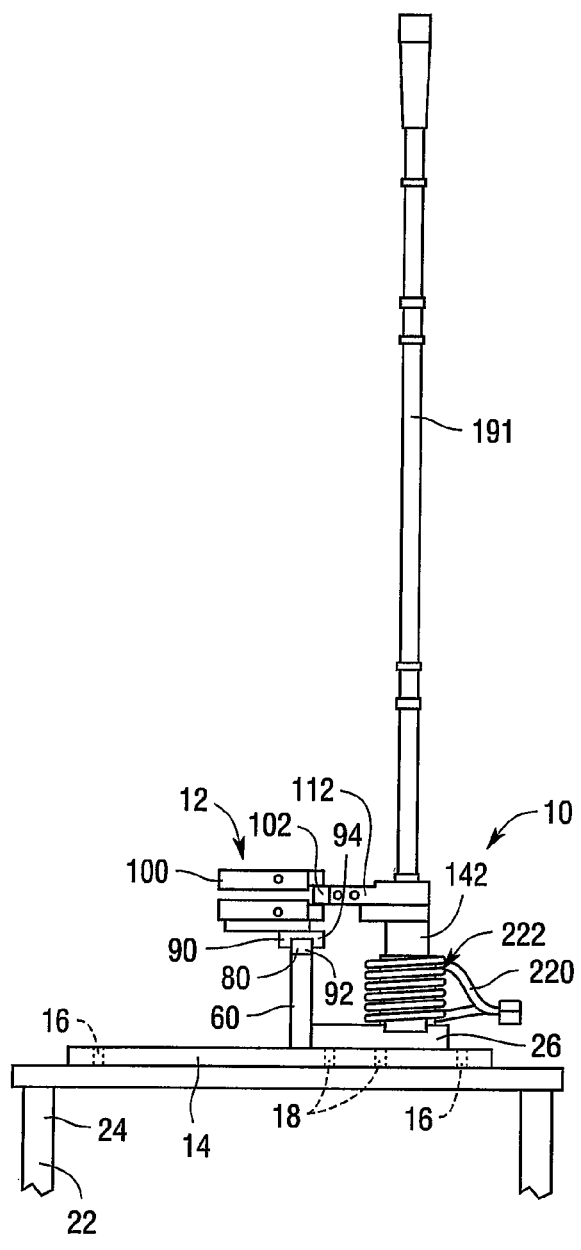

INDUCTION MOLDED COMPONENTS AND METHOD OF INDUCTION FORMING COMPONENTS FOR MOLD PARTING LINE MINIMIZATION

BACKGROUND

In the injection molding process melted thermoplastic and thermosetting polymers are heated and forced into a mold during an injection process. The mold can be in the form of a die made of two halves. A witness line, also known as a parting line, extends in the formed piece where the two mold halves abut one another.

For many applications the witness line poses no problem and the formed product functions perfectly fine. However, in other applications a significant problem arises because of the parting line. For example, in applications where tight clearances are required and the molded part requires smooth surfaces the parting line quickly becomes a problem. For example, where O-rings abut parting lines leakage may occur.

Thus, there is a need for an apparatus and method for eliminating or smoothing out the parting line in products formed by injection molding and other molding methods.

SUMMARY

There is provided a molding assembly comprising a jaw holding assembly that includes a base member that, in turn, is joined to a workpiece locating member. The workpiece locating member is connected to a riser member, and a rail is mounted on the riser member and a carriage is supported on the rail. The workpiece may be embodied as a tube connector in one of the preferred embodiments.

The molding assembly also includes a jaw holder that is mounted on the carriage, the jaw holder supports first and second forming dies. Each of the forming dies has internal ribs abut one another when the first and second dies are brought together. Together, the first and second ribs form an elliptical rib having an elliptical shaped curved surface.

A workpiece having an O-ring recess and parting line protrusions is provided and it is disposed between the first and second dies, such that diametrically opposed first and second gaps are defined between the first and second forming dies and the workpiece where the parting line protrusions are located.

An induction coil is provided and when activated the first and second dies heat up and melt the parting line protrusions. After cooling, the parting line protrusions are no longer present. Thus, when an O-ring is moved into the O-ring recess a leak proof seal is provided, because the O-ring forms a leak proof seal with the workpiece.

BRIEF DESCRIPTION OF THE DRAWING FIGURES

Figure 2:
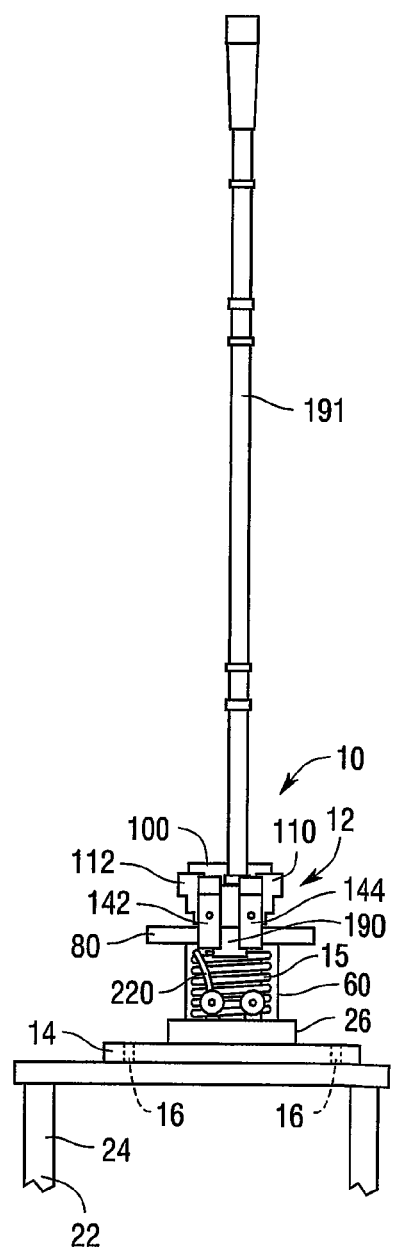
Figure 3:
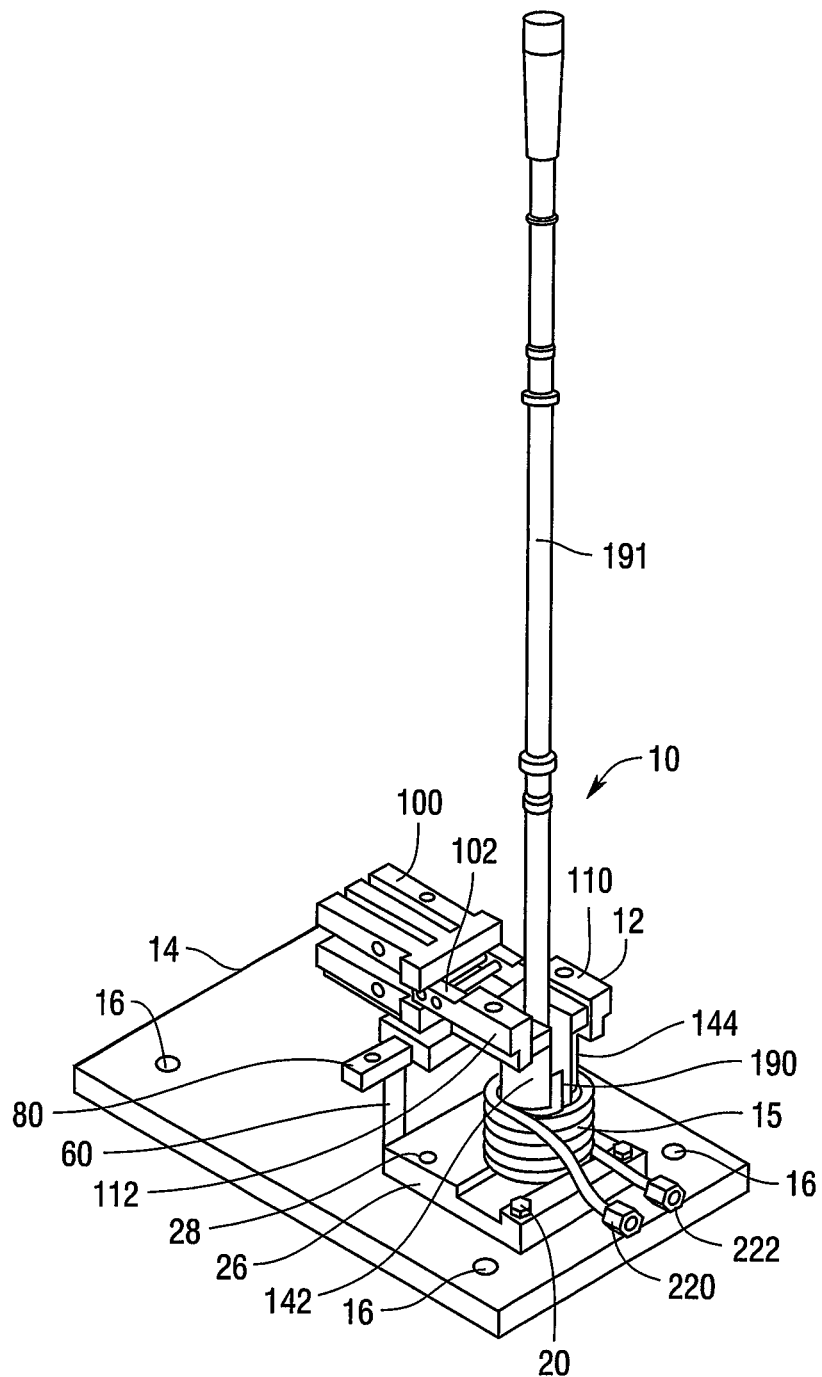
Figure 4:
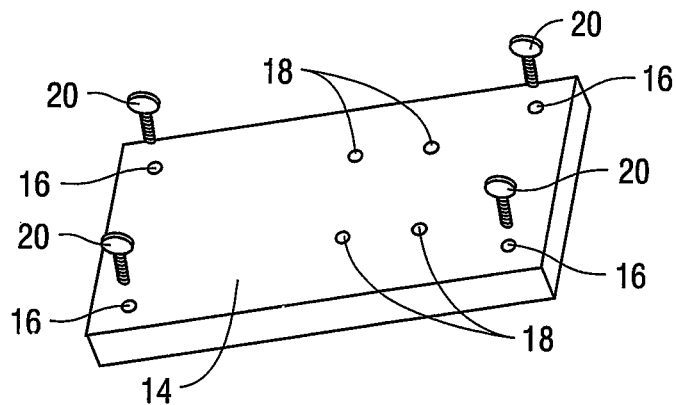
Figure 5:
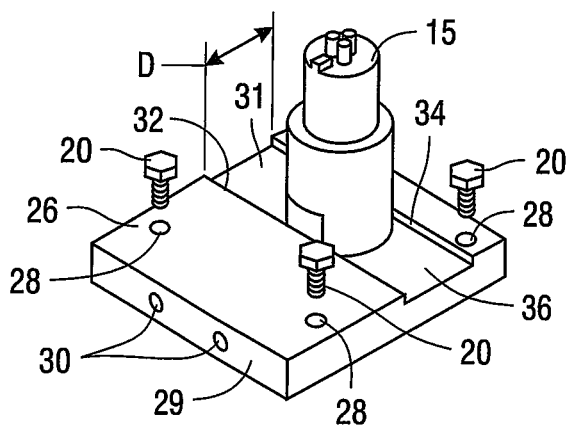
Figure 6:
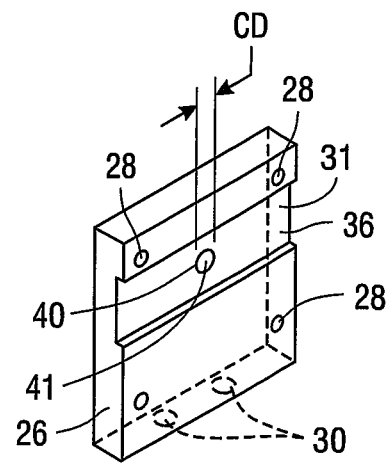
Figure 7:
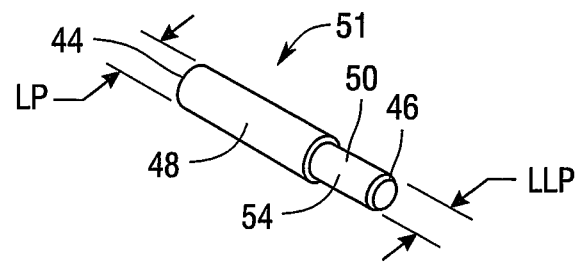
Figure 8:
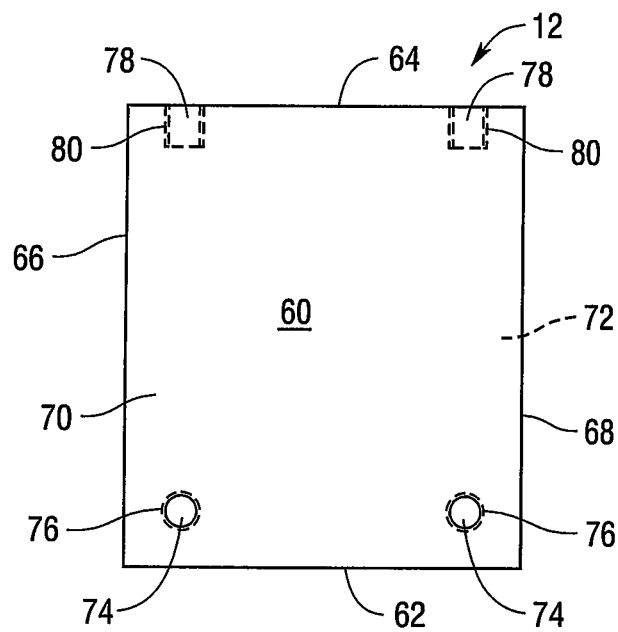
Figure 9:
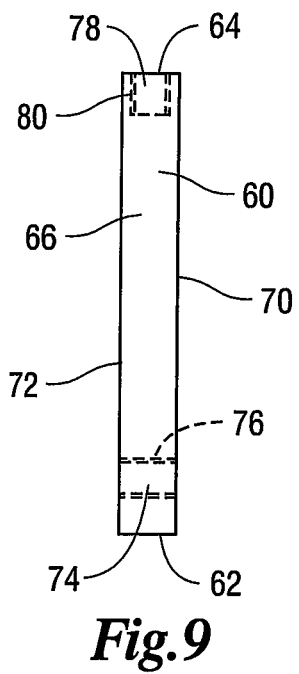
Figure 10:
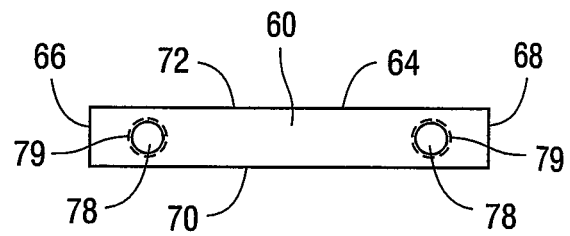
Figure 11:
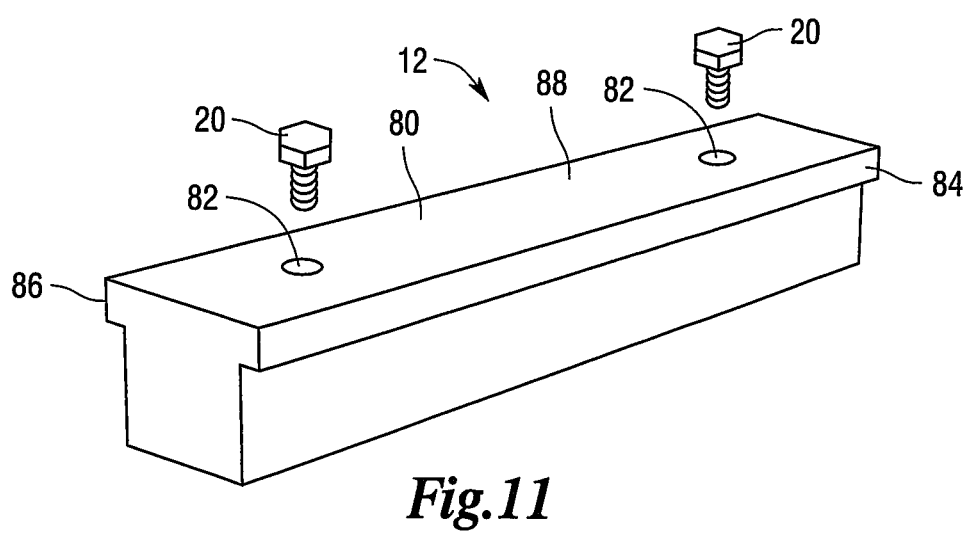
Figure 12:
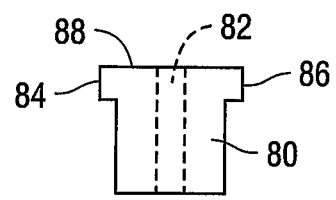
Figure 13:
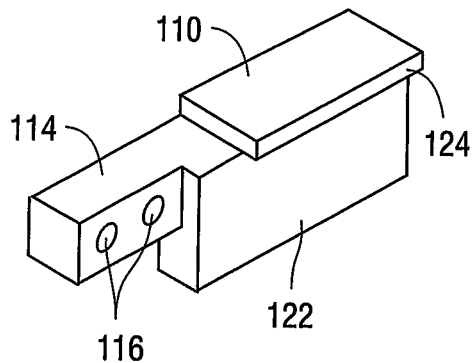
Figure 14:
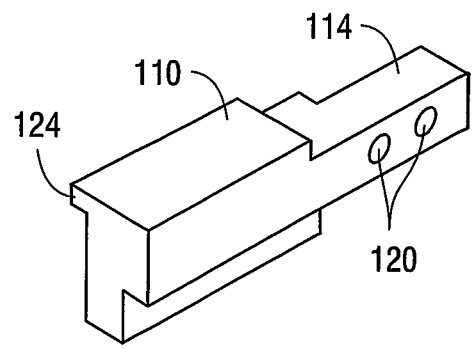
Figure 15:
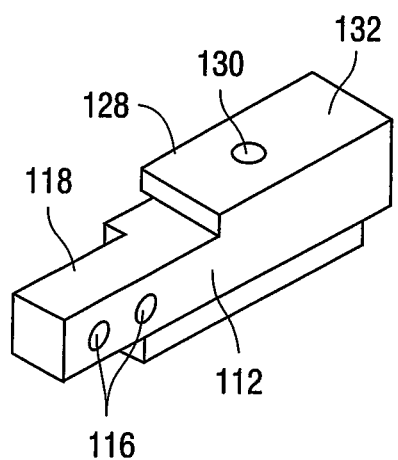
Figure 16:
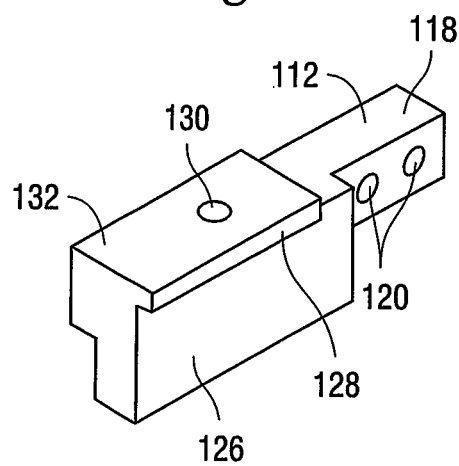
Figure 17:
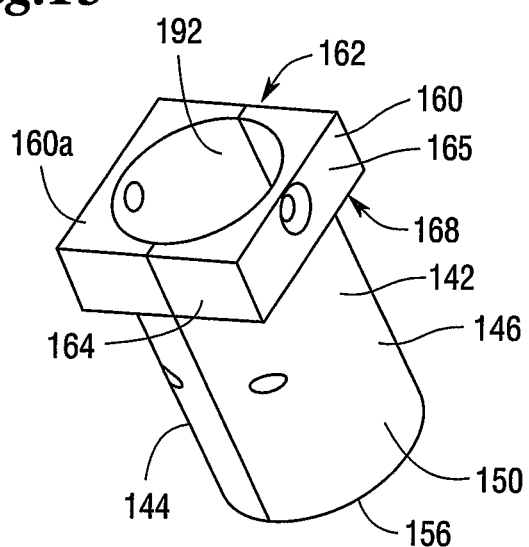
Figure 18:
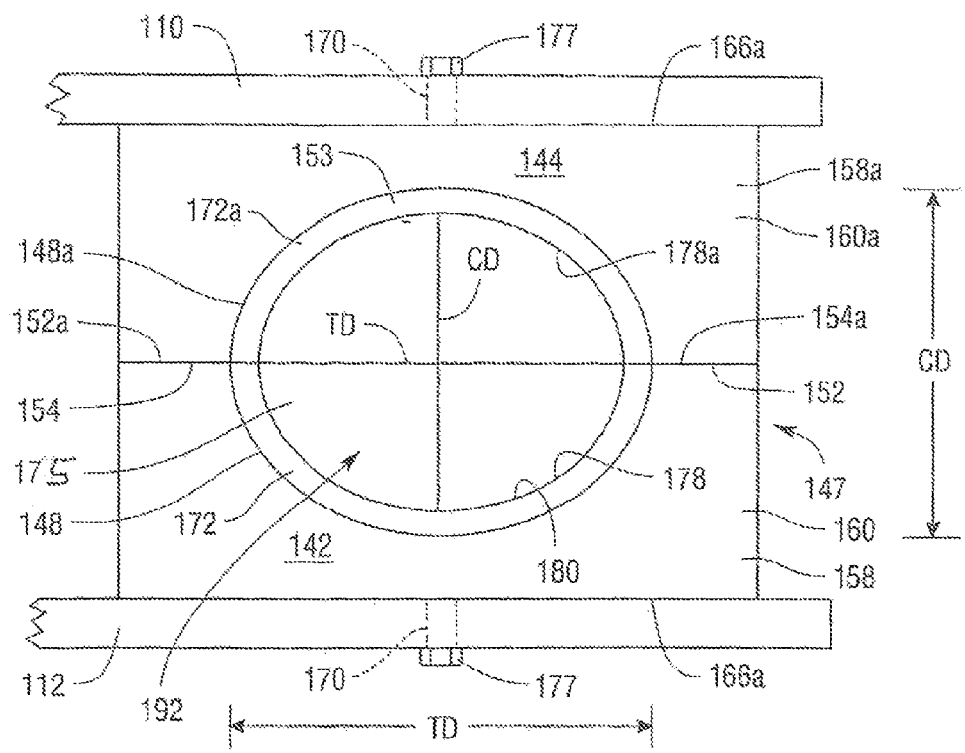
Figure 19:
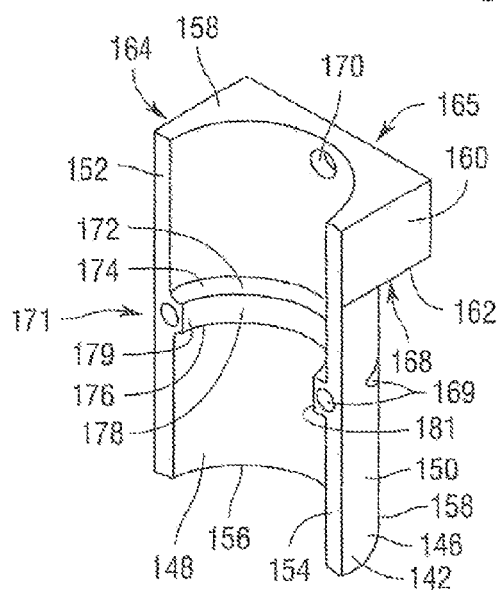
Figure 20:
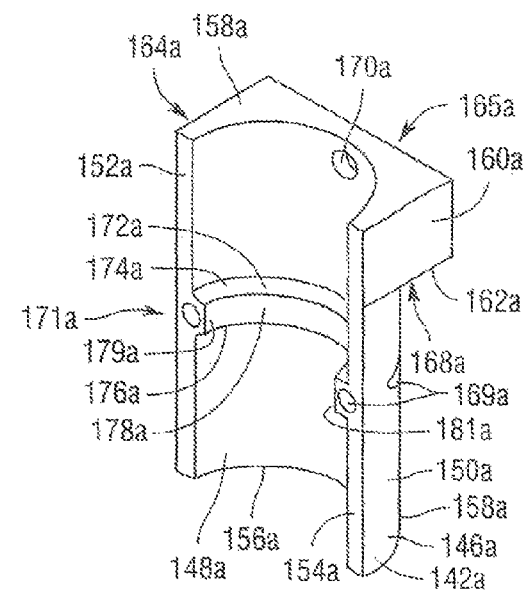
Figure 21:
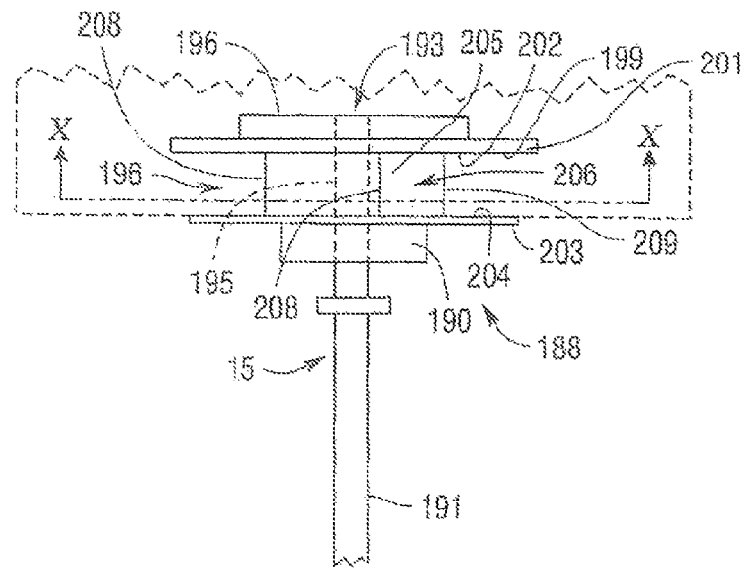
Figure 22:
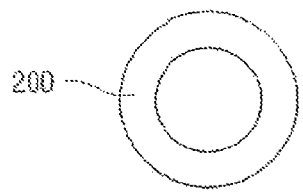
Figure 23:
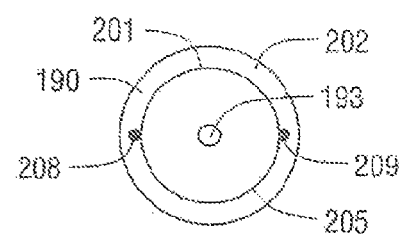
Figure 24:
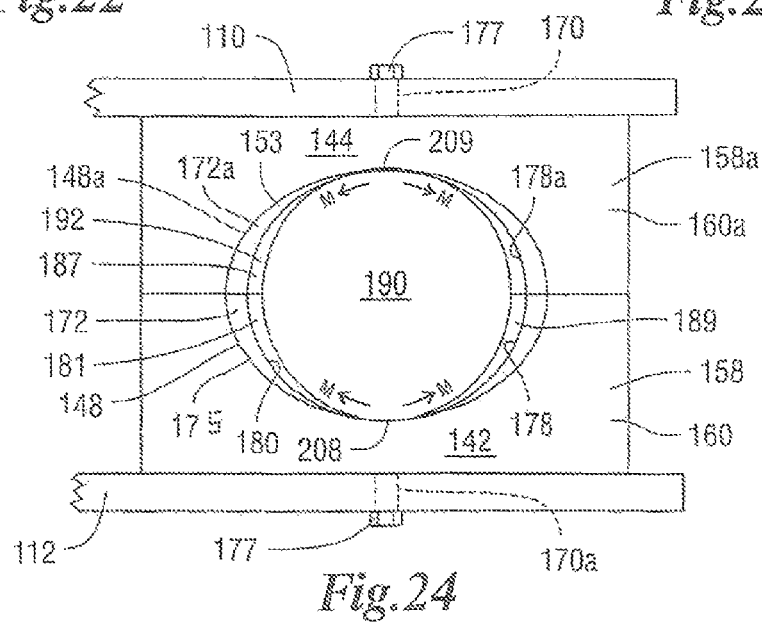
Figure 25:
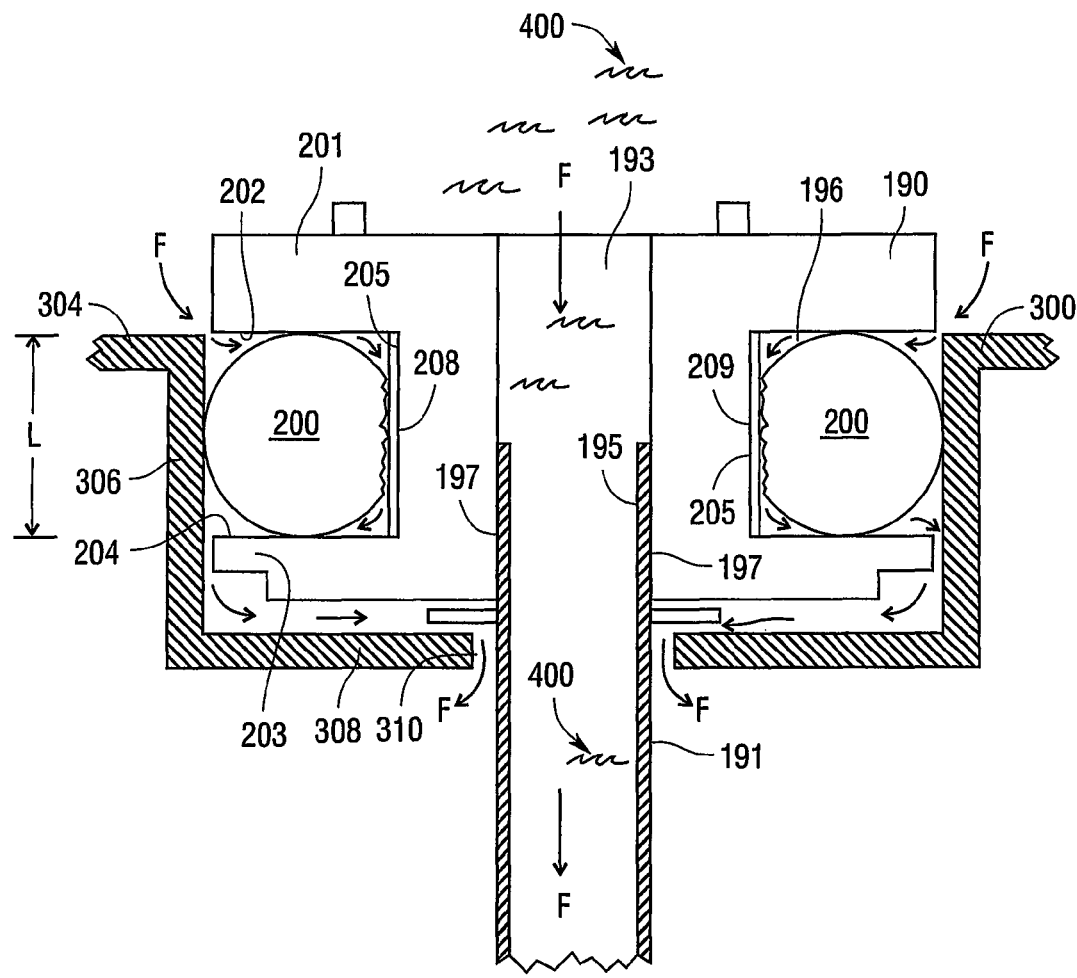
Figure 26:
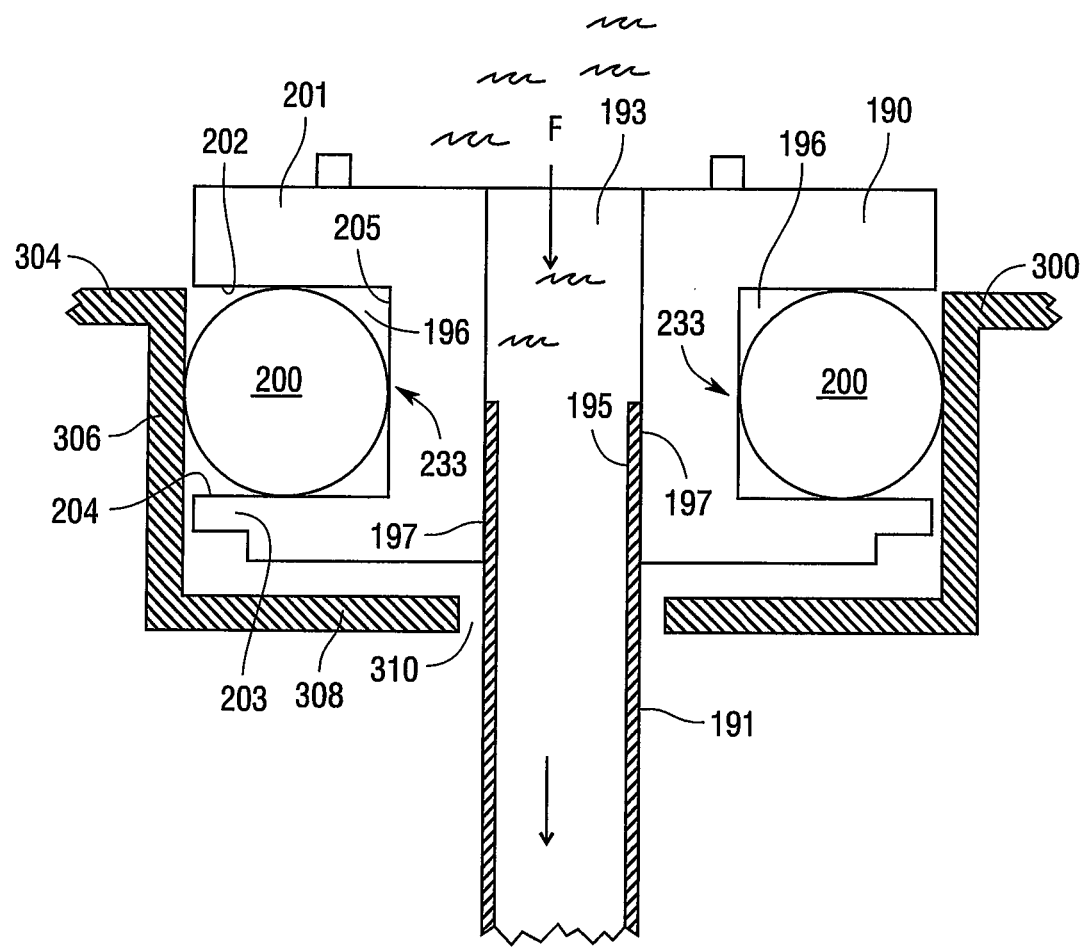
Figure 27:
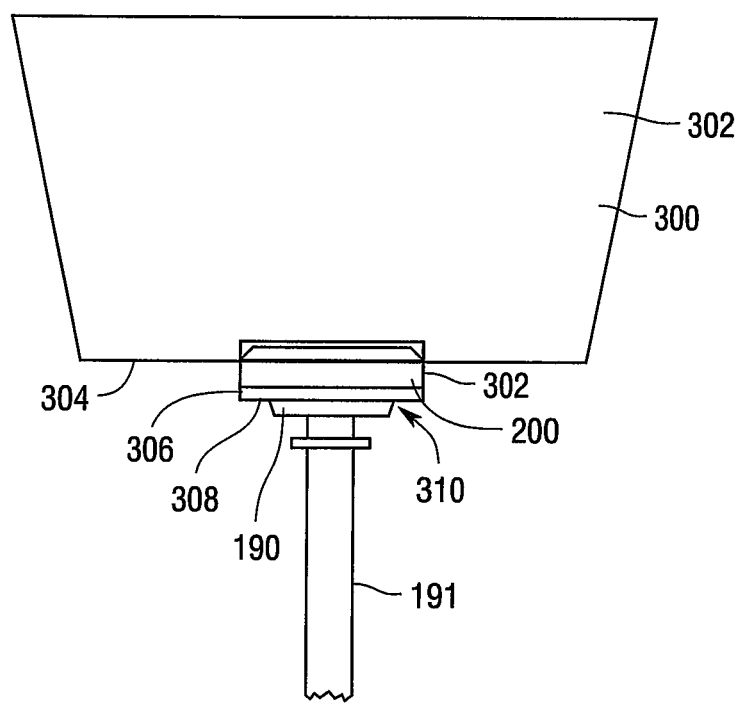

FIG. 1 is a side elevational view of a molding assembly.
FIG. 2 is a front view of the molding assembly.
FIG. 3 is a perspective view of the molding assembly.
FIG. 4 is a perspective view of a base member.
FIG. 5 is a perspective view of a workpiece locating member and workpiece support.
FIG. 6 is a perspective view of the workpiece locating member.
FIG. 7 is a perspective view of a locating pin.
FIG. 8 is a front view of a riser member.
FIG. 9 is a side view of the riser member.
FIG. 10 is a top view of the riser member.
FIG. 11 is a perspective view of a rail.
FIG. 12 is an end view of the rail.
FIG. 13 is a front side perspective view of a first jaw.
FIG. 14 is a rear perspective view of the first jaw.
FIG. 15 is a front perspective view of a second jaw.
FIG. 16 is a rear perspective view of the second jaw.
FIG. 17 is a perspective view of abutting first and second forming dies.
FIG. 18 is a top view of the abutting first and second forming dies.
FIG. 19 is a perspective view the first die.
FIG. 20 is a perspective view of the second die.
FIG. 21 is a side view of a tube connector.
FIG. 22 is a top view of an O-ring for being received in the tube connector.
FIG. 23 is a sectional view of the tube connector taken along line X-X of FIG. 21.
FIG. 24 is a top view of first and second forming dies that abut one another wherein the tube connector is disposed in the first and second forming lines.
FIG. 25 is a sectional view of the tube connector and the O-ring wherein first and second parting lines extend from the tube connector and the tube connector is disposed in a housing.
FIG. 26 is a sectional view of the tube connector after induction heating and the first and second parting lines are no longer present and wherein the tube connector is disposed in the housing with an O-ring disposed between the housing and the tube connector to form a leak proof seal.
FIG. 27 is a front view of the housing.

DESCRIPTION

As shown in FIGS. 1-3, there is provided a molding assembly 10 that comprises a jaw holding assembly 12. The jaw holding assembly 12 includes a base member 14 best shown in FIG. 4. The base member 14 defines a first set of base member bores 16 and a second set of base member bores 18 and is shaped like a plate in one of the preferred embodiments. The first set of base member bores 16 may be internally threaded and are for accommodating fasteners including bolts, screws, rivets and other suitable connects commonly designated 20. The base member 14 may be made of metal and is joined to a base supporting structure 22 with the fasteners 20, as shown in FIGS. 1-3. The base supporting structure 22 may be embodied as a workbench or worktable 24 or other suitable work surface or structure. In addition, welds may be used to join the base member 14 to the supporting structure 22. The second set of bores 18 may be internally threaded and are adapted to receive the fasteners 20.

The jaw holding assembly 12 further includes a workpiece locating member 26 shown in FIGS. 1-3 and best shown in FIG. 5. The workpiece locating member 26 may have the shape of a plate and made of metal and defines locating member bores commonly designated 28. When the workpiece locating member 26 is positioned on the base member 14 the second set of bores 18 are aligned with the locating bores 28, and fasteners 20 are moved into the locating bores 28 and second set of bores 18 of the base member 14, thus securing the workpiece locating member 26 to the base member 14. In other preferred embodiments the base plate 14 and workpiece locating member 26 may be welded or clamped together or otherwise joined.

As best shown in FIG. 5, the workpiece locating member 26 has a connecting side edge 29 that defines edge bores 30 that may be internally threaded in one of the preferred embodiments. The workpiece locating member 26 also defines a channel or recess 31, and the channel 31 is defined by a first and second opposed channel side walls 32, 34 and a channel base wall 36. The first and second channel side walls 32, 34 are spaced a workpiece distance designated D from one another. The molding assembly 10 also includes a workpiece support 15. The workpiece distance D is such that when the workpiece support 15 is positioned in the channel 31 the workpiece support 15 abuts the first and second channel side walls 32, 34 in one of the preferred embodiments. In addition, although the channel 31 is shown to be an offset channel 31, in other preferred embodiments the workpiece channel 31 may be otherwise located, for example centrally located in the workpiece locating member 26.

As best shown in FIG. 6, the workpiece locating member 26 further defines a channel base wall recess or opening 40 defined by a channel base wall internal surface 41 that may or may not have an internal thread. The channel base wall opening 40 has a channel base wall diameter designed CD.

As shown in FIG. 7, the jaw holding assembly 12 further includes a locating pin 42 having opposed locating pin ends 44, 46 and having first and second pin portions 48, 50 that are joined to one another, such that the locating pin 42 is a one piece body 51 in one of the preferred embodiments. The first pin portion 48 has a locating pin diameter designated LP, and the second pin portion 50 has a second locating pin diameter designated LLP in FIG. 7. The first locating pin diameter LP is greater than the second locating pin diameter LLP in one of the preferred embodiments. In other preferred embodiments the entire locating pin may have a single locating pin diameter throughout the entire length thereof.

The second locating pin diameter designated LLP of the second pin portion 50 is less than the channel base wall diameter designed CD. The second pin portion 50 capable of being fitted into the channel base wall opening 40 and may be in a close fitting relationship, for example the exterior pin surface 54 of the second pin portion 50 may abut against the channel base wall internal surface 41 that defines the channel base wall opening. The locating pin 42 extends into the workpiece support 15 in one of the preferred embodiments to secure the workpiece support 15 in place.

As shown in FIGS. 8-9, the jaw holding assembly 12 further includes a riser member 60. The riser member 60 has opposed first and second riser member edges 62, 64, opposed first and third and fourth riser member edges 66, 68 and opposed first and second riser member sides 70, 72. There are side openings 74 defined in the riser member 60 that extend through the riser member 60. The side bores 74 may be defined by side bore internal threads 76. Similarly, the second riser member edge 64 has second riser member edge side bores 78. The second riser member edge side bores 78 are defined by second riser member edge internal threads 79.

The connecting side edge 29 of the workpiece locating member 26 abuts against the first riser member side 70 of the riser member 60, such that the edge bores 30 of the workpiece locating member 26 are aligned with the side openings 74 defined in the riser member 60. Fasteners 20 are then inserted into the side openings 74 and threaded to the edge bores 30 of the workpiece locating member 28, thus joining them together. In other preferred embodiments a weld may be used to join the workpiece locating member 26 and riser member 60. It is understood that welds may replace fasteners throughout this application in all situations that allow for a weld instead of a fastener.

As shown in FIGS. 1-3 and 11 and 12, the jaw holding assembly 12 further includes a rail 80 and a carriage 90. The rail 80 defines rail bores 82, and has opposed lips 84, 86 and a rail surface 88. The rail is 80 is joined to the riser member 60. In particular, fasteners 20 extend through the rail bores 82 and are threaded to the above-described second riser member edge internal threads 79. The rail 80 and may be other wise joined to the riser member 60, for example with a weld in other preferred embodiments. As shown in FIG. 1, the carriage 90 has a carriage guide 92 that defines a carriage receiving channel 94. The rail 80 is positioned in the carriage receiving channel 94 and supported on the rail surface 88 and such that the carriage 90 may be moved linearly along the rail 80.

As shown in FIGS. 1-3, the jaw holding assembly 12 further includes a jaw holder 100 that is mounted on the carriage 90. The jaw holder 100 defines jaw recesses commonly designated 102.

As shown in FIGS. 1-3 and FIGS. 13-16 the molding assembly 10 further includes first and second jaws 110, 112 that are held and supported by the jaw holder 100 that are made of metal, metal alloys plastic or other suitable material. The first jaw 110 has a first jaw end portion 114 that is fitted in one of the jaw recesses 102 and may be secured to the jaw holder 100 with a fastener 20. The first jaw end portion 114 defines a pair of apertures commonly designated 116. The second jaw 112 has a second jaw end portion 118 that is fitted in one of the jaw recesses 102 and may be secured to the jaw holder 100 with a fastener 20. The second jaw end portion 118 defines a pair of apertures commonly designated 120.

The first jaw 110 has a first jaw die abutting side 122 and a first jaw die retaining wall portion 124 that extends beyond the first jaw die abutting side 122. Similarly, the second jaw 112 has a second jaw die abutting side 126 and a second jaw die retaining wall portion 128. The first and second die retaining wall portions 124, 128 and first and second die abutting sides 122, 126 are for retaining first and second forming dies 142, 144 in place. The second jaw 112 also defines a jaw opening 130 that extends from an aperture side 132 of the second jaw 112 into the second jaw 112. The first and second jaws 110, 112 are each made as one-piece bodies in one of the preferred embodiments.

The previously mentioned first and second forming dies 142, 144 of the molding assembly 10 are shown in FIGS. 17-20. The first and second jaws 110, 112 are for supporting a first forming die 142 and a second forming die 144. In one of the preferred embodiments the first and second forming dies 142, 144 are structurally the same. As shown in FIGS. 17 and 19, the first forming die 142 if formed as a one-piece body in one of the preferred embodiments and has a contact head portion 160 and has a curved portion 146 that extends from the contact head portion 160. The first forming die 142 has opposed first and second die ends 156, 158. The curved portion 146 has an outer curved surface 150 that extends from the first die end 156 to the contact head portion 160. The first forming die 142 also has a inner curved surface 148 and has first and second contact edges 152, 154. The contact head portion 160 has opposed first and second contact head surfaces 162, 164 that are flat in one of the preferred embodiments, with a jaw contact surface 166 extending from the first contact head surface 162 to the second contact head surface 164. The contact head portion 160 also has a curved head surface 168 that extends from the outer curved surface 150 to the opposed first and second contact head surfaces 162, 164 and the jaw contact surface 166. A contact head opening 170 extends through the contact head 160.

Extending from the first edge 152 to the second edge 154 and from the inner curved surface 148 is rib 172. The rib 172 has opposed rib surfaces 174, 176 that extend to and meet with a curved rib surface 178. The curved rib surface 178 has first and second curved rib surface ends 179, 181.

As previously mentioned, as shown in FIG. 20 the second forming die 144 is structurally the same as the first forming die 142. Accordingly, the second forming die 144 is formed as a one-piece body in one of the preferred embodiments and has a contact head portion 160a and has a curved portion 146a that extends from the contact head portion 160a. The second forming die 144 has opposed first and second die ends 156a, 158a. The curved portion 146a has an outer curved surface 150a that extends from the first die end 156a to the contact head portion 160a. The second forming die 144 also has an inner curved surface 148a and has first and second contact edges 152a, 154a. The contact head portion 160a has opposed first and second contact head surfaces 162a, 164a that are flat in one of the preferred embodiments, with a jaw contact surface 166a extending from the first contact head surface 162a to the second contact head surface 164a. The contact head portion 160a also has a curved head surface 168a that extends from the outer curved surface 150a to the opposed first and second contact head surfaces 162a, 164a and the jaw contact surface 166a. A contact head opening 170a extends through the contact head 160a.

The second forming die 144 also has extending from the first edge 152a to the second edge 154a and from the inner curved surface 148a is rib 172a. The rib 172a has opposed rib surfaces 174a, 176a that extend to and meet with a curved rib surface 178a. The curved rib surface 178a has first and second curved rib surface ends 179a, 181a.

A fastener 177 may be extended through the contact head openings 170, 170a to hold the first forming die 142 to the second jaw 112 and to hold the second forming die 144 to the first jaw 110.

As shown in FIG. 18, the first and second forming dies 142, 144 are capable of being moved together and clamped such that the first edge 152 of the first forming die 142 abuts the second edge 154a of the second forming die 144, and the second edge 154 of the first forming die 142 abuts the first edge 152a of the second forming die 144. When the first and second forming dies 142, 144 abut one another together they define an elliptical shaped die opening 175 that meets with a die cavity 192, and the die cavity 192 is defined, in part, by the inner curved surfaces 148, 148a of the first and second forming dies 142, 144. In addition, when the first and second forming dies 142, 144 abut one another the ribs 172, 172a of the first and second forming dies 142, 144 are aligned and abut one another and together they form an elliptical shaped rib 153 that extends into the die cavity 192, and the elliptical shaped rib 153 defines, in part, the die cavity 192.

In addition, as shown in FIG. 18, when the first and second forming dies 142, 144 contact one another, together the curved rib surfaces 178, 178a of the first and second forming dies 142, 144 meet or abut one another. In particular, the first curved rib surface end 179 of the first forming die 142 meets or abuts with the second curved rib surface end 181a of the second forming die 144, and the second curved rib surface end 181 of the first forming die 142 meets or abuts against the first curved rib surface end 179a of the second firm die 144. Together the curved rib surfaces 178, 178a form an elliptical shaped curved surface 180. The elliptical shaped curved surface 180 has a curved surface a conjugate diameter (minor axis) designed CD in FIG. 18, and a curved surface a transverse diameter (major axis) designed TD in FIG. 18. The transverse diameter (the major axis TD diameter) of the elliptical shaped curved surface 180 extends from where the first curved rib surface end 179 of the first forming die 142 meets or abuts with the second curved rib surface end 181a of the second forming die 144 to where the second curved rib surface end 181 of the first forming die 142 meets or abuts against the first curved rib surface end 179a of the second forming die 144.

The curved portions 146, 146a of the first and second dies 142, 144 define first and second curved portion openings 169, 171, 169a, 171a respectively, that extend through the curved portions 146, 146a and the first and second edges 152, 154, 152a, 154a of the curved portions 146, 146a such that rib openings 173, 173a are defined in the first and second edges 152, 154, 152a, 154a, respectively. These openings may be used to allow a fastener 177 to pass therethrough and to hold the first and second die forming dies 142, 144 together.

As shown in FIGS. 21, 25 and 26 there is a workpiece 188. In one of the preferred embodiments the workpiece 188 is embodied as a tube connector 190, and the tube connector 190 is supported on the workpiece support 15. A tube 191 extends from the tube connector 190.

In particular, the tube connector 190 defines a tube bore 193, and a first end portion 195 of the tube 191 is disposed in the tube bore 193. The tube 191 and tube connector 190 are joined with, for example, an adhesive, such that when joined fluid is unable to flow between the first end portion 195 of the tube 191 and the tube connector 190. Other suitable methods may be used to join the tube 191 and the tube connector 190. After joining the tube connector 190 and the end portion 195 a leak-proof seal 197 is formed. The tube 191 has an opposed second end portion 194 (FIG. 21) that joined to connector component 177 that may or may not be structurally the same as the tube connector 190 or may be connected to, for example, a drain or reservoir (not shown).

As shown in FIG. 21, the tube connector 190 has a base end portion 199 that includes a base end surface 196. The tube connector 190 defines an O-ring recess 196 adapted to receive an O-ring 200 therein as shown in FIGS. 21-23, 25 and 26. The tube connector 190 has first and second containing walls 201, 203 that have first and second containing wall surfaces 202, 204. The first and second containing walls 201, 203 face one another and each meets with an O-ring contact surface 205 that extends from the first containing wall surface 202 to the second containing wall surface 204. An O-ring recess 206 is defined by the first and second containing wall surfaces 202, 204 and the O-ring contact surface 205. The O-ring contact surface 205 has a generally cylindrical shape and first and second parting line protrusions 208, 209 extend from the O-ring contact surface 205, and the first and second parting line protrusions 208, 209 are diametrically opposed, that is, they are situated one hundred eighty degrees (180 degrees) from one another on the O-ring contact surface 205 as shown in FIG. 23. Each of the first and second parting line protrusions 208, 209 extends from the first containing wall surface 202 to the second containing wall surface 204 and across the O-ring contact surface 205. The first and second parting line protrusions 208, 209 were formed during the manufacturing process of the tube connector 190. Parting lines and parting line protrusions are well known to those having ordinary skill in the art.

The tube connector 190 is adapted to be fitted in a housing 300, as shown in FIGS. 25-27, and the housing 300 may be embodied as a collection container in one of the preferred embodiments. The housing 300 has a surrounding housing wall portion 302 that meets with a housing base wall 304.

Extending from the housing base wall 304 is a connector receiving housing 306 and the connector receiving housing 306 has a connector receiving housing base wall 308 that defines a connector receiving housing opening 310, and the connector receiving housing opening is sized such that a portion of the tube connector 190 can be fitted through the connector receiving housing opening 310 as will be described presently.

FIGS. 25 and 26 are sectional views of s a views of the assembled tube connector 190 and the collection container 300, with FIG. 25 showing an embodiment wherein the first and second parting line protrusions 208, 209 formed in the O-ring contact surface 205 have not be removed. In FIG. 26, the first and second parting line protrusions 208, 209 are not present.

FIG. 25 details the problems associated with parting lines. In particular, as shown the first and second parting line protrusions 208, 209 are problematic in that when the O-ring 200 is moved into the O-ring recess 206 the first and second parting line protrusions 208, 209 prevent the O-ring 200 from forming a leak-proof seal. In FIG. 25 there is a fluid 400 (that may be liquid or gas or a combination of both that may or may not be under pressure) flowing from the container 300 (indicated by the arrows designed F) and flowing around the O-ring 200. In particular, the fluid 400 seeps or flows between the O-ring 200 and the O-ring contact surface 205 where the first and second parting line protrusions 208, 209 extend from the O-ring contact surface 205. The deformation in the O-ring 200 caused by the presence of the first and second parting line protrusions 208, 209 allow for such undesirable flow and leakage As shown in FIG. 26, the above described first and second first forming dies 142, 144 are for eliminating the first and second parting line protrusions 208, 209, such that the O-ring 200 forms a leak-proof seal with the O-ring contact surface 205 of the tube connector 190. In particular, as shown in FIGS. 1-3 there is an induction coil 220 that is connected to and powered by an induction generation machine (not shown). Induction generators for inducing heat in a part undergoing induction in order to induce heat in said part are well known to those having ordinary skill in the art and are not described in greater detail herein. The induction coil 220 defines an induction coil opening 222 having an induction coil inner diameter that is sized to receive the first and second forming dies 142, 144 therein.

As shown in FIGS. 1-3 and 24 the tube connector 190 is moved into the channel 31 defined in the workpiece locating member 28. The first and second jaws 110, 112 that may be connected to the first and second forming dies 142, 144 are closed around the tube connector 190. When the first and second forming dies 142, 144 are in a closed position 147 they abut one another, and the elliptical rib 153 is thus formed and disposed in the O-ring recess 196 of the tube connector 190. In particular, the connector member 190 is positioned in the first and second forming dies 142, 144 such that the first and second parting line protrusions 208, 209 are aligned with curved surface conjugate diameter CD (the minor axis) of the above-described elliptical shaped curved surface 180. When so positioned, the first and second parting lines 208, 209 abut against the elliptical shaped curved surface 180 along their lengths designated L in FIG. 25. Thus, a line that passes though the first and second parting line protrusions 208, 209 also passes through the curved surface conjugate diameter CD (the minor axis) of the above-described elliptical shaped curved surface 180.

When the induction coil 220 is activated the first and second forming dies 142, 144 are heated and the first and second parting lines 208, 209 are heated and melt. The material from which the first and second parting line protrusions 208, 209 were formed melts and flow in the directions of the arrows designated M (FIG. 24) such that the first and second parting lines 208, 209 no longer exist. After the step of melting the first and second parting lines 208, 209 is completed the O-ring 200 is capable of forming a leak-proof seal 233 with the tube connector as shown in FIG. 26.

In addition, during the heating process no new or additional parting lines are formed or created in the tube connector 190. In FIGS. 18 and 24, the first and second forming dies 142, 144 are in the closed position 147, with FIG. 24 showing the tube connector 190 disposed in the first and second forming dies 142, 144. As shown in FIG. 24, when in the closed position 147, a first gap 187 is defined from the elliptical shaped curved surface 180 of the elliptical shaped rib 153 and the O-ring contact surface 205 of the tube connector 190, and a diametrically opposed second gap 189 is defined from the elliptical shaped curved surface 180 of the elliptical shaped rib 153 and the O-ring contact surface 205 of the tube connector. As previously described, the induction coil 220 is supplied with electrical power and this causes the first and second dies 142, 144 to heat up and melt the material from which the first and second parting lines protrusions 208, 209 of tube connector 190 is made. As this occurs the parting line protrusions 208, 209 melt, but the first and second gaps 187, 189 prevent the remainder of the tube connector 190 from melting. Thus, the first and second gaps 187, 189 prevent another set of parting lines protrusions from forming in the tube connector 190.

As shown in FIGS. 26 and 27, when the tube connector 190 is installed in the housing 300 after having been induction heated as described above, the O-ring 200 forms a leak-proof seal 233. In particular, when the tube connector 190 is fitted in the connector receiving housing 306 the O-ring 200 forms leak-proof seals 233 with both the connector receiving housing 306 and the O-ring contact surface 205 of the tube connector 190.

It is pointed out that the other end of the tube 191 that extends from the connector 190 may attach to a plurality of different connectors and other tube through which fluids move.

In other preferred embodiments the first and second forming dies 142, 144 may be made of materials other than metal and the induction generator may be replaced with other types of heat generating machines.

It is to be understood that the method of removing parting lines as disclosed herein by use of the first and second forming dies 142, 144 is not limited to just the tube connector 190 application described herein, but may be used in all applications where it is desirable to remove parting lines from a workpiece 188, or necessary to remove parting lines from a workpiece, regardless of the workpiece and/or intended use of the workpiece.

In other preferred embodiments, other sources of heat may be used to heat the first and second forming dies 142, 144, and the present invention is not limited to just induction type heating.

It will be appreciated by those skilled in the art that while the molding assembly 10 and method for molding have been described in connection with particular embodiments and examples, the molding assembly 10 and methods for molding are not necessarily so limited and that other examples, uses, modifications, and departures from the embodiments, examples, and uses may be made without departing from the molding assembly 10 and methods for molding, and all these embodiments are intended to be within the scope and spirit of the appended claims.

What is claimed:

1. A molding assembly comprising:
a first forming die having opposed first and second die ends and having an inner curved surface and first and second contact edges; and the first forming die has a rib that extends from the inner curved surface thereof;
a second forming die having opposed first and second die ends and having an inner curved surface and first and second contact edges; and the second forming die has a rib that extends from the inner curved surface thereof;
the first edge of the first forming die abuts the second edge of the second forming die and the second edge of the first forming die abuts the first edge of the second forming die and the first and second forming dies define a die cavity;
the rib of the first forming die abuts the rib of the second forming die and together the rib of the first forming die and the rib of the second forming die form an elliptical shaped rib that extends into the die cavity; and,
a jaw holding assembly having a base member and a workpiece locating member that is joined to the base member and the workpiece locating member has a connecting side edge, and the jaw holding assembly further including a riser member that abuts the connecting side edge of the workpiece locating member and is connected to the workpiece locating member, and the jaw holding assembly further includes a rail and a carriage and the riser member is connected to the rail and wherein the carriage has carriage guides that engage the rail and the carriage is mounted on the rail such that it is movable on the rail; and,
wherein the jaw holding assembly further includes a jaw holder that is mounted on the carriage and the jaw holder defines jaw recesses and the jaw assembly further includes first and second jaws that are held and supported by the jaw holder wherein the first jaw has a first jaw die abutting side second jaw has a second jaw die abutting side and wherein the first and second jaws support the first and second forming dies; and an induction coil disposed around the first and second forming dies and the induction coil for heating the first and second forming dies.

2. The molding assembly according to claim 1 wherein the rib that extends from the first forming die has a curved rib surface having first and second curved surface ends and the rib that extends from the second forming die has a curved rib surface having first and second curved surface ends.

3. The molding assembly according to claim 2 wherein the first curved rib surface end of the first forming die abuts the second curved rib surface end of the second forming die, and the second curved rib surface end of the first forming die abuts the first curved rib surface end of the second forming die.

4. The molding assembly according to claim 3 wherein the curved rib surfaces of the first and second forming dies form an elliptical shaped curved surface.

5. The molding assembly according to claim 4 wherein the elliptical shaped curved surface has a curved surface a conjugate diameter and a curved surface a transverse diameter, and the transverse diameter of the elliptical shaped curved surface extends from where the first curved rib surface end of the first forming die abuts the second curved rib surface end of the second forming die to where the second curved rib surface end of the first forming die abuts against the first curved rib surface end of the second forming die.

6. A molding assembly for use in connection with a workpiece, the molding assembly comprising:
a first forming die having opposed first and second die ends and having an inner curved surface and first and second contact edges; and the first forming die has a rib that extends from the inner curved surface thereof;
a second forming die having opposed first and second die ends and having an inner curved surface and first and second contact edges; and the second forming die has a rib that extends from the inner curved surface thereof;
the first edge of the first forming die abuts the second edge of the second forming die and the second edge of the first forming die abuts the first edge of the second forming die and the first and second forming dies define a die cavity;
the rib of the first forming die abuts the rib of the second forming die and together the rib of the first forming die and the rib of the second forming die form an elliptical shaped rib having an elliptical shaped curved surface and the elliptical shaped rib extends into the die cavity;
an induction coil and the first and second forming dies disposed in the induction coil such that the induction coil surrounds the first and second forming dies and the induction coil is capable of heating the first and second forming dies; and,
wherein the workpiece adapted to be received in the die cavity.

7. The molding assembly according to claim 6 wherein the workpiece defines an O-ring recess, and the workpiece has first and second containing walls that have facing first and second containing wall surfaces that extend to an O-ring contact surface, such that the O-ring contact surface extends from the first containing wall surface the second containing wall surface.

8. The molding assembly according to claim 7 wherein the first and second containing wall surfaces and the O-ring contact surface define an O-ring recess.

9. The molding assembly according to claim 7 wherein the O-ring contact surface has a cylindrical shape and diametrically opposed first and second parting line protrusions extend from the O-ring contact surface such that the first and second parting line protrusions are disposed one hundred eighty degrees from one another on the O-ring contact surface and each of the first and second parting line protrusions extends from the first containing wall surface to the second containing wall surface.

10. The molding assembly according to claim 9 wherein the workpiece is disposed in the first and second forming dies and the first and second parting line protrusions are aligned with a curved surface conjugate diameter of the elliptical shaped curved surface and abut against the elliptical shaped curved surface of the elliptical shaped rib such that the first and second parting lines can be melted by the first and second forming dies when the first and second forming dies are heated.

11. A method of forming a workpiece to remove parting lines, the method comprising the acts of:
providing molding assembly having a first forming die having opposed first and second die ends and having an inner curved surface and first and second contact edges; and the first forming die has a rib that extends from the inner curved surface thereof;
providing a second forming die having opposed first and second die ends and having an inner curved surface and first and second contact edges; and the second forming die has a rib that extends from the inner curved surface thereof;

abutting the first edge of the first forming die against the second edge of the second forming die and abutting the second edge of the first forming die against the first edge of the second forming die and defining a die cavity in the first and second forming dies;

wherein the rib of the first forming die abuts the rib of the second forming die and together the rib of the first forming die and the rib of the second forming die form an elliptical shaped rib that extends into the die cavity;

providing the rib that extends from the first forming die with a curved rib surface having first and second curved surface ends and providing the rib that extends from the second forming die with a curved rib surface having first and second curved surface ends and disposing the workpiece in the first and second forming dies and abutting the first curved rib surface end of the first forming die against the second curved rib surface end of the second forming die, and abutting the second curved rib surface end of the first forming die against the first curved rib surface end of the second firm die and forming to form an elliptical shaped curved surface on the elliptical shaped rib;

providing the elliptical shaped curved surface with a curved surface a conjugate diameter and a curved surface a transverse diameter, and the transverse diameter of the elliptical shaped curved surface extends from where the first curved rib surface end of the first forming die abuts the second curved rib surface end of the second forming die to where the second curved rib surface end of the first forming die abuts against the first curved rib surface end of the second forming die; and, placing the workpiece in the first and second forming dies and abutting the parting lines against the elliptical shaped curved surface such that a minor axis of the elliptical shaped curved surface aligns with the first and second parting line protrusions and heating the first and second forming dies and melting the first and second parting lines.

12. The method according to claim 11 further wherein when the workpiece is a tube connector having an O-ring contact surface and when the tube connector is disposed in the first and second forming dies first and second gaps are defined by the O-ring contact surface and the transverse diameter of the elliptical shaped curved surface extends through the first and second gaps such that additional parting lines are not formed in the tube connector.

\* \* \* \* \*